Figures 1, 2:
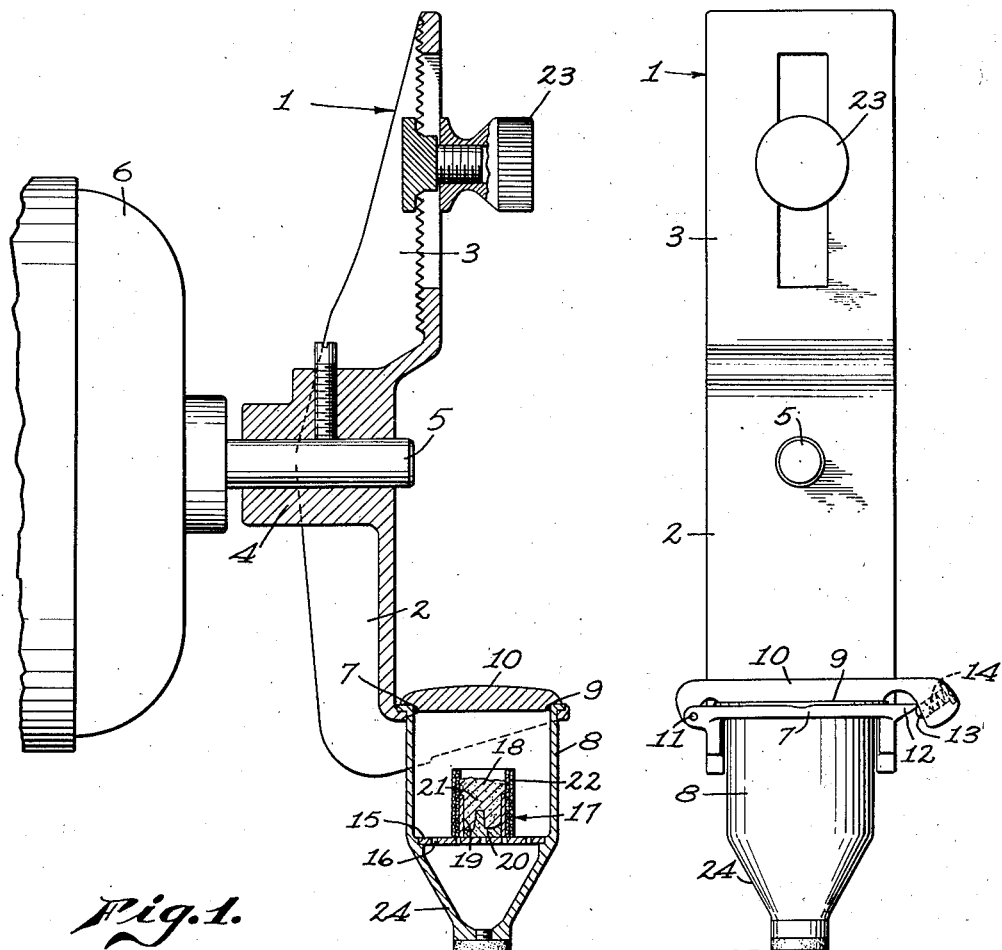

Nov. 10, 1936.  J. D. SHRIBER  2,060,474
MOLDING APPARATUS
Filed Sept. 21, 1934

Inventor
Joseph D. Shriber
By Lyon & Lyon
Attorneys

Patented Nov. 10, 1936

2,060,474

UNITED STATES PATENT OFFICE 2,060,474

MOLDING APPARATUS

Joseph D. Shriber, Los Angeles, Calif.

Application September 21, 1934, Serial No. 744,915

4 Claims. (Cl. 18—5.7)

This invention relates to a method and apparatus for molding articles of a metal that is capable of forming an amalgam, and while the invention is capable of use for different specific purposes, in the following specification it is described for enabling metal dies to be formed for use in performing dental work.

One of the objects of the invention is to provide a method and apparatus which will enable a mold formed of a soft or plastic material, which has been impressed to form a mold cavity of the desired shape and configuration, to be used directly to produce the molded metal die to be used in the construction of an inlay for a tooth. In practicing my invention as applied to dental work, I form a die of rigid metal from an amalgam, and this die supports the impressed wax when carving the same to the desired shape to fit the bite.

A further object of the invention is to provide a method and apparatus which will enable an amalgam of the metal which is to form the die, to be used to hold the wax that has the impression of the tooth and its cavity, and to provide means operating thereafter to effect the removal of the mercury from the amalgam. In this way the molded article or die is formed of the hard metal, which is employed in making the inlay.

A further object of the invention is to provide simple means for supporting the mold, and subjecting the same to centrifugal force; also to provide means for catching and holding the mercury, which is withdrawn from the amalgam employed in forming a molded article or die.

The invention consists in the novel parts and combination of parts to be described hereinafter, all of which contribute to produce an efficient molding apparatus.

A preferred embodiment of the invention is described in the following specification, while the broad scope of the invention is pointed out in the appended claims.

The drawing illustrates a preferred construction of apparatus for practicing my invention.

Figure 1 is a vertical section taken through a centrifugal bar and passing through the mold so as to illustrate the construction of the mold and its arrangement when it is carried on the centrifugal bar. In this view the bar is shown in a vertical plane, which would be its position of rest, and in this view the shaft for driving the centrifugal arm and a portion of the motor is illustrated, broken away.

Fig. 2 is a front elevation of the centrifugal bar.

Before proceeding to a more detailed description of the invention, it should be stated that in accordance with my method, I employ a mold of a soft plastic material such as wax, and in this mold I form the impression or mold chamber, which has the shape which I desire to reproduce in the metal which is to be molded. When the invention is practiced in connection with dental work, the mold chamber in the wax would have the form of the dental cavity which the inlay is intended to fill. After having formed the mold chamber of the desired shape, I fill the same with an amalgam of the metal which is to form the molded article or die. The amalgam should be in a rather fluid condition, so as to enable it to flow readily into all the small irregular recesses that may appear in the surface of the mold chamber. After the amalgam has been applied so as to completely fill the mold, I subject the mold to centrifugal action through the agency of which the mercury will be extracted from the other metal with which it is amalgamated. For dental practice, silver dies can be very readily formed in this way.

The method and apparatus will now be described more in detail.

Referring more particularly to the parts, I indicates a centrifugal bar which includes two radially projecting arms 2 and 3, that project in opposite directions from a hub 4, which is preferably constructed so as to enable it to be attached securely to the shaft 5, such as the shaft of an electric motor 6, capable of driving the shaft at a high speed. In the position of rest of the apparatus, the arm 2 extends downwardly, and its lower end is formed into a socket 7 to receive a removable cup 8. If desired, the mouth 9 of the cup may be provided with a removable cover 10, which may be secured by a hinge connection 11 to the socket 7 at one side, and the wall of the socket may be provided at the other side with a projecting toe 12 to cooperate with a yielding catch such as the ball 13, pressed by a spring 14 so as to give a snap action in closing the cover or lid 10. The cup 8 is preferably provided with a perforated false bottom 15. In Fig. 1, 16 indicates these perforations. On the perforated bottom 15, I place a mold 17 which contains the amalgam 18, from which the article or die is to be formed. The mold 17 comprises a holder 19 in the form of an annular wall such as a band of copper, bent to fit around the tooth, and this holder retains a matrix or molding material 20, which is preferably a plastic material such as wax, which has been impressed by the tooth to form the molding chamber 21 having the shape of the article or die that is to be formed. Around the exterior of the holder 19, I provide an envelope 22. For this purpose I prefer to employ several layers of ordinary adhesive tape, which is wrapped around the wall of the holder 19 in such a way that the upper portion of the envelope extends considerably above the upper edge of the holder 19. In this way an extension of the chamber 21 is formed above the upper edge of the holder, so that the amalgam 18, when used to fill the molding chamber, will also fill this extension of the molding chamber and lie in contact with the envelope 22. Having completed the mold as described, and filled the mold chamber with the amalgam 18, I place the mold within the centrifugal cup 8 and adjust a counterbalance 23 on the arm 3, so as to properly counterbalance the weight of the cup and the arm 2. I then start the motor 6 and subject the mold containing the amalgam, to the centrifugal action which is developed by the rotation of the centrifugal bar 1. In a motor rotating at a speed of 3000 R. P. M., or thereabouts, it will be found that in a few minutes the mercury will have passed out of the amalgam 18 and through the perforations 16, being collected in an extension 24 of the cup beyond the perforated bottom 15. This mercury can then be removed when desired, by removing a threaded plug 25 (see Fig. 1). It will be found that the metal remaining in the mold, will be hard and dense, and of such a character that it can be readily used as a die to be held while the wax adhering to it is carved to desired form by the dentist to fit the bite.

The mode of operation of my method and apparatus is not completely understood by me. At first, I believed that the mercury and the amalgam pass outwardly in a finely divided state through the wax 20, but experiments which I have performed, do not seem to confirm that theory. My present belief is that the mercury in the inner end of the amalgam with respect to the axis of rotation, and under the action of the centrifugal force, travels radially outward on the outer side of the copper band 19, and between the band and the envelope 22, and passes radially outwardly from the axis of rotation toward the perforated plate or bottom 15, through which it finds its way. In this way the space between the envelope 22 and the band 19, operates as a duct for carrying off the mercury from the amalgam under the action of the centrifugal force. It seems that after a certain time, all of the mercury in the amalgam above the upper edge of the holder 19, will have been drawn off in this way, and as this occurs, the other metal of the amalgam, for example, silver in the upper part of the mold chamber, will be left with microscopic pores from which the mercury has been evacuated. These microscopic pores then exert a capillary attraction on the mercury which is still in the amalgam and in the chamber 21, which is actually within the wax 20. This capillary attraction, I believe, draws the mercury inwardly on the centrifugal radius, in spite of the centrifugal force being exerted on this mercury, and as soon as this residue of mercury has moved into the upper portion of amalgam or plug 18, as viewed in Fig. 1, it will be carried off in the same manner in which the movement of the mercury was initiated. Regardless of whether my theory of the operation of this method is correct or not, I have repeatedly obtained the results described by the use of this apparatus, and can produce a hard silver die in a few moments with molding apparatus of this character, and employing my method.

The die carrying the wax 20 can then be removed from the holder and can be carved away by the dentist to enable it to articulate properly with the opposed tooth in the opposite jaw. After the outer end of the wax on the die has been properly shaped, the wax constitutes a complete pattern for the inlay. It can then be removed from the die and used with an investment in a mold to form a mold chamber in which the inlay is cast.

It is understood that the embodiment of the invention described herein is only one of the many embodiments this invention may take, and I do not wish to be limited in the practice of the invention, nor in the claims, to the particular embodiment set forth.

What I claim is:

1. In apparatus for molding an article of metal that is capable of forming an amalgam, the combination of a holder to receive a mold for the amalgam, having an annular wall for retaining the amalgam, an envelope capable of absorbing mercury disposed around the holder and extending above the upper edge of the holder so that it will be in contact with the amalgam when placed in the holding chamber, and means for subjecting the holder containing the amalgam to the action of centrifugal force to separate the mercury from the said metal.

2. In apparatus for molding an article of a metal that is capable of forming an amalgam, the combination of a holder having an annular wall for retaining a plastic molding material with a mold cavity formed therein, a wall of porous material capable of absorbing mercury, enveloping the annular wall of the holder and extending upwardly above the same, and forming extension of the mold chamber above the plastic material so that when the amalgam of the metal is placed in the mold cavity its upper portion will be in contact with the porous wall of the envelope, means for subjecting the said parts while carrying the amalgam to the action of centrifugal force to separate the mercury from the said metal, and means for catching the mercury that is extracted from the amalgam.

3. In apparatus of the kind described, the combination of a centrifugal bar having a hub for securing the same to a rotary shaft, said bar having an arm extending substantially radially from the hub and having a socket, a cup received in the said socket with the mouth of the cup disposed toward the hub, said cup having a perforated false bottom therein and having an extension beyond the false bottom for receiving a liquid passing through the perforated false bottom.

4. In apparatus of the kind described, the combination of a centrifugal bar having a hub for securing the same to a rotary shaft, said bar having an arm extending substantially radially from the hub and having a socket, a cup received in the said socket with the mouth of the cup disposed toward the hub, said cup having a perforated false bottom therein and having an extension beyond the false bottom for receiving a liquid passing through the perforated false bottom, said bar including a counterbalancing arm located diametrically opposite to the first-named arm and having an adjustable counterweight mounted thereon.

JOSEPH D. SHRIBER.